US006301020B1

(12) United States Patent
Dow et al.

(10) Patent No.: US 6,301,020 B1
(45) Date of Patent: Oct. 9, 2001

(54) APPLIANCE AND METHOD FOR CAPTURING IMAGES HAVING A USER ERROR INTERFACE

(75) Inventors: James C. Dow, Fort Collins; Dan L. Dalton, Greeley; Michael L. Rudd, Fort Collins; Karin C. Ruffatto, Fort Collins; Barry K. Hansen, Fort Collins, all of CO (US); Daniel Formosa, Montvale, NJ (US); Michael J. DeVries, Loveland; Nancy Shepard, Arvada, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,572

(22) Filed: Aug. 7, 1998

(51) Int. Cl.[7] .............................. H04N 1/024; H04N 1/40
(52) U.S. Cl. ............................................ 358/473; 358/444
(58) Field of Search ..................................... 358/473, 474, 358/471; 382/313, 316, 318, 321; 345/345, 346, 336, 337, 338; 707/201; 348/232, 231

(56) References Cited

U.S. PATENT DOCUMENTS

| | | | |
|---|---|---|---|
| 5,111,409 | * 5/1992 | Gasper et al. | 395/152 |
| 5,331,434 | * 7/1994 | Kikinis | 358/474 |
| 5,595,445 | * 1/1997 | Bobry et al. | 358/473 |
| 5,640,002 | * 6/1997 | Ruppert et al. | 235/472 |
| 5,686,937 | * 11/1997 | Li et al. | 345/123 |
| 5,892,971 | * 4/1999 | Danielson et al. | 395/827 |
| 5,923,444 | * 7/1999 | Bohn et al. | 358/473 |
| 5,940,546 | * 7/1999 | Howard et al. | 382/313 |
| 5,978,016 | * 11/1999 | Lourette et al. | 348/64 |
| 6,000,000 | * 12/1999 | Hawkins et al. | 707/201 |

* cited by examiner

Primary Examiner—Cheukfan Lee

(57) ABSTRACT

A capturing and viewing appliance and method are provided for capturing and communicating images to other devices with communication capabilities. The capturing and viewing appliance includes a processor for manipulating and viewing the images on a built-in display. Program code stored in internal memory includes an error utility interface which informs the user of an error in operating the appliance. According to another aspect of the invention, the error interface provides a user-friendly interface for learning how to correctly operate the appliance after an error in operation has occurred. Through the use of icons, operational buttons, and animated sequences the present invention presents a novel user interface which makes the error interface and method a solution in devices with limited resources which need to be able to communicate with users correct methods of operating an appliance. The error interface and method is designed for communicating with the user through instrument reuse which is especially useful in portable hand-held appliances or other devices which are capable of displaying images where space and compactness are a concern.

24 Claims, 7 Drawing Sheets

APPLIANCE AND METHOD FOR CAPTURING IMAGES HAVING A USER ERROR INTERFACE

CROSS REFERENCE TO RELATED APPLICATIONS

This application is related to U.S. application entitled "APPLIANCE AND METHOD OF USING SAME HAVING A SEND CAPABILITY FOR STORED DATA" (Ser. No. 09/130,869), U.S. application entitled "APPLIANCE AND METHOD OF USING SAME HAVING A USER HELP CAPABILITY" (Ser. No. 09/130,080), U.S. application entitled "APPLIANCE AND METHOD OF USING SAME FOR CAPTURING IMAGES" (Ser. No. 09/130,573), U.S. application entitled "APPLIANCE AND METHOD OF USING SAME HAVING A DELETE CAPABILITY FOR SAVED DATA" (Ser. No. 09/130,082), U.S. application entitled "APPLIANCE AND METHOD USING SAME HAVING A CAPABILITY TO GRAPHICALLY ASSOCIATE AND DISASSOCIATE DATA WITH AND FROM ONE ANOTHER" (Ser. No. 09/130,789), U.S. application entitled "APPLICATION AND METHOD FOR COMMUNICATING AND VIEWING MULTIPLE CAPTURED IMAGES" (Ser. No. 09/130,081), U.S. application entitled "APPLIANCE AND METHOD FOR NAVIGATING AMONG MULTIPLE CAPTURED IMAGES AND FUNCTIONAL MENUS" (Ser. No. 09/130,584), U.S. application entitled "APPLIANCE AND METHOD FOR VIEWING CAPTURED IMAGES" (Ser. No. 09/131,258), and U.S. application entitled "APPLIANCE AND METHOD FOR MENU NAVIGATION" (Ser. No. 09/130,868), which are filed contemporaneously herewith and are incorporated herein by reference.

BACKGROUND OF THE INVENTION

1. Field of the Invention

The present invention generally relates to the field of digital capturing and, more particularly, relates to a user interface for a portable hand-held capturing and communicating appliance for communicating errors associated with operation of the appliance and methods of correcting the error.

2. Related Art

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modern PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, a heretofore unaddressed need exists in the industry for providing a hand-held image capturing appliance and method that allows users to navigate among multiple captured images, as well as functional menus in the appliance before transferring the captured images to some other unit such as a computer, printer, or facsimile machine. In addition, the capturing device should provide cordless operation and use a standard interface for transferring images to other devices. A GUI is preferred to assist users, particularly novices, in operating the device.

SUMMARY OF THE INVENTION

The present invention overcomes the inadequacies and deficiencies of the prior art as discussed hereinbefore. The present invention provides an image capturing appliance incorporating a user error interface for communicating to the user erroneous operation of the appliance and ways to correct the error through use of text messages and animation. This interface, in conjunction with other interfaces, facilitates ease of use and hardware simplification and miniaturization of the capturing appliance for seamless integration of the appliance into a consumer's existing tools and processes.

The capturing appliance contains a capturing means such as photocells and a storage means for storing captured images. A processing means is also provided for processing the acquired image and displaying it on a self-contained display of the appliance. Program instructions are provided in the memory of the appliance and allows the user to process images through menu selection on the display of the appliance. Program instructions are also provided in memory to invoke text messages to inform a user of an operating error and animated sequences to communicate to the user how to operate the appliance correctly.

The error interface and method provides a user interface incorporating on-screen icons, dialog boxes and operational buttons for designating operations to be performed by the appliance as well as animated sequences to assist the user in learning how to correctly operate the appliance. The present invention has many advantages, a few of which are delineated hereafter, as examples.

An advantage of the user error interface and method of the present invention is that they provide a simple procedure informing the user how to correctly operate an appliance using functional buttons.

Another advantage of the user error interface and method of the present invention is that they provide a more flexible and user friendly procedure for correctly operating an appliance.

Another advantage of the user error interface and method of the present invention is that they provide a procedure for communicating a user error and method of correction which is simple, easy to learn and efficient.

Another advantage of the user error interface and method of the present invention is that they can be employed in virtually any graphical user interface (GUI).

Other features and advantages of the present invention will become apparent to one with skill in the art upon examination of the following drawings and detailed description. It is intended that all such additional features and advantages be included herein within the scope of the present invention, as is defined by the claims.

DETAILED DESCRIPTION OF THE PREFERRED EMBODIMENT

Figure 1A:
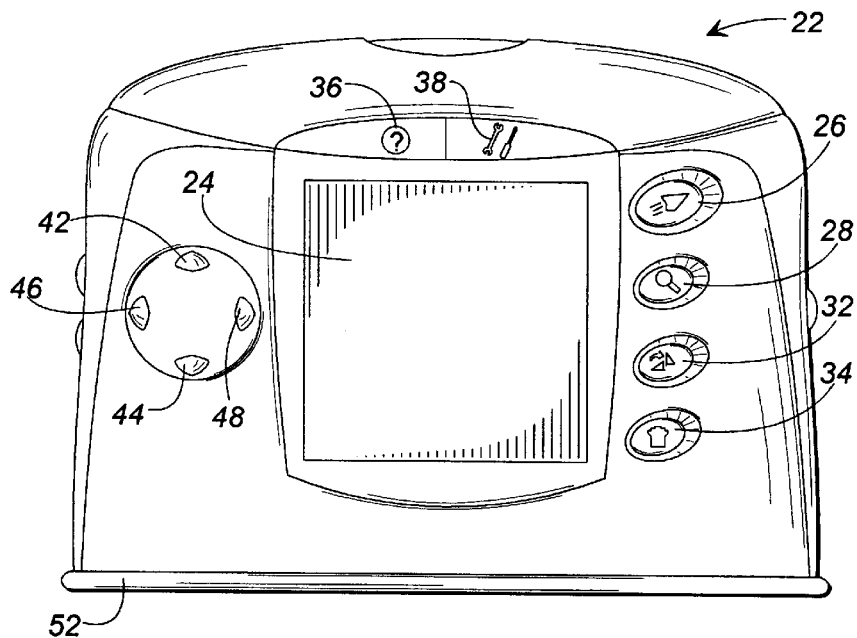
FIG. 1A is an elevation view of the hand-held image capture and communication appliance according to the present invention, which depicts a side of the unit containing the display screen, operation buttons, and navigation buttons.

Reference is now made to the drawings wherein like reference numerals designate corresponding parts throughout these several figures. It should be understood by those skilled in the art that some aspects of the present invention may be practiced on any apparatus for the purposes directing operating instructions to a user, not limited to apparatuses which include or do not include image capturing capabilities through a photoelement array or scanning.

Architecture of the Image Capture and Communication Appliance

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, liquid crystal displays (LCDs) and field emission displays (FEDs). Display 24 is the means by which information, including captured images, text, icons, and animations, is communicated to the user. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been scanned into memory through photoelement array 52. Activation of tools button 38 presents the user with a menu that includes possible image operations (e.g., image attachment/grouping, image detachment/ungrouping), changing the mode of appliance 22 (i.e., toggling between text (binary) capture and image (grayscale) capture), calibrating appliance 22, displaying a screen identifying important specifications such as a model number, hardware or software release number, memory usage, selecting a page size for printing, etc., or other user utilities not deserving of a dedicated external button for activation. Help button 36 provides the user with access to general tutorials, process animations, and how-to instructions on the operation of appliance 22 and context sensitive instruction when requested while another operation or menu is active. The navigation buttons include an up button 42, a down button 44, a left button 46, and a right button 48 and are controlled by the user to steer a course through menu items and to view images or pages that have been captured in memory.

Figure 1B:
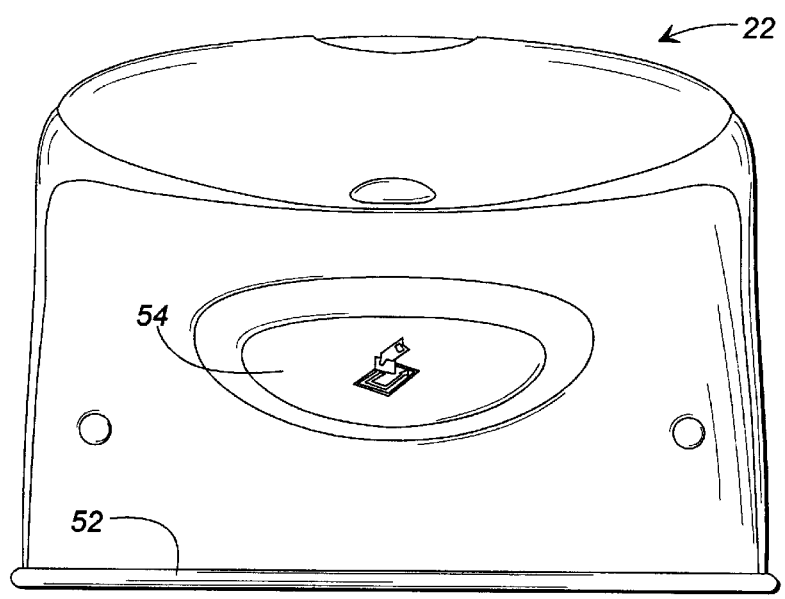
FIG. 1B is an elevation view of the appliance of FIG. 1A depicting the opposing side to that illustrated in FIG. 1A which contains the capture button for performing an image capture.
Figure 1C:
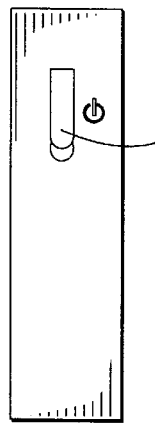
FIG. 1C is an elevation view of the appliance of FIGS. 1A and 1B depicting an end of the unit, which contains the power button.
Figure 1D:
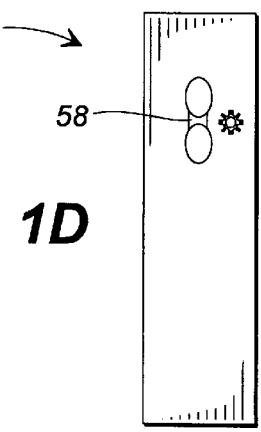
FIG. 1D is an elevation view of the appliance of FIG. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to scan an image through photoelement array 52 and is released once the image is captured. A power switch 56 is included at one end of appliance 22 as shown in FIG. 1C and a contrast control 58 for display 24 is located at the other end of appliance 22 as shown in FIG. 1D. The positioning of the various buttons, power button 56 and contrast control 58 on appliance 22 as shown in FIGS. 1A through 1D is merely exemplary and can be modified as needed to satisfy the ergonomic requirements of the targeted user community.

Figure 2:
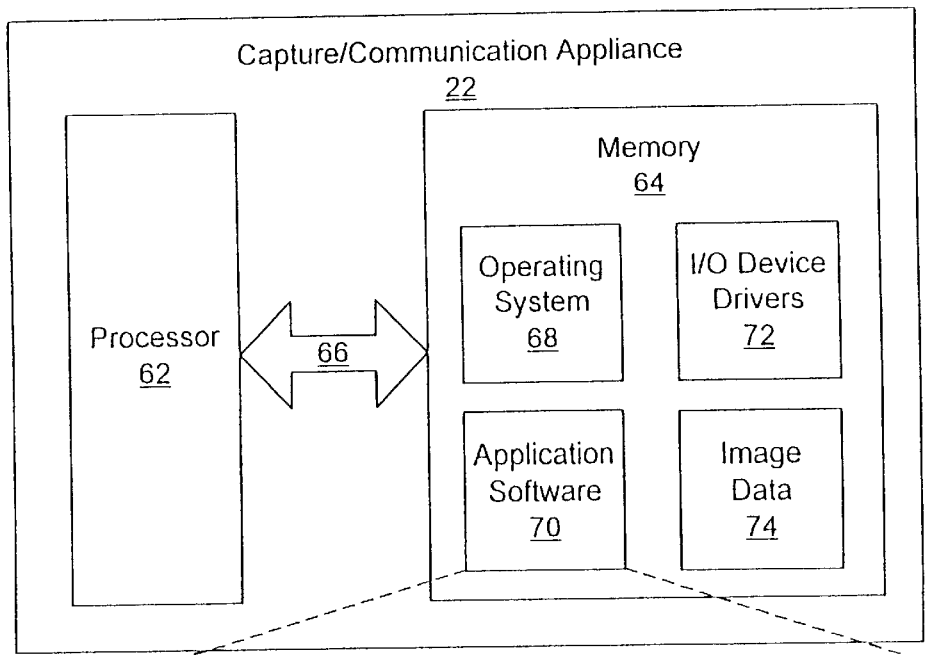
FIG. 2 is a high-level block diagram of the internal hardware and software architecture of the appliance illustrated in FIGS. 1A–1D.
Figure 2:
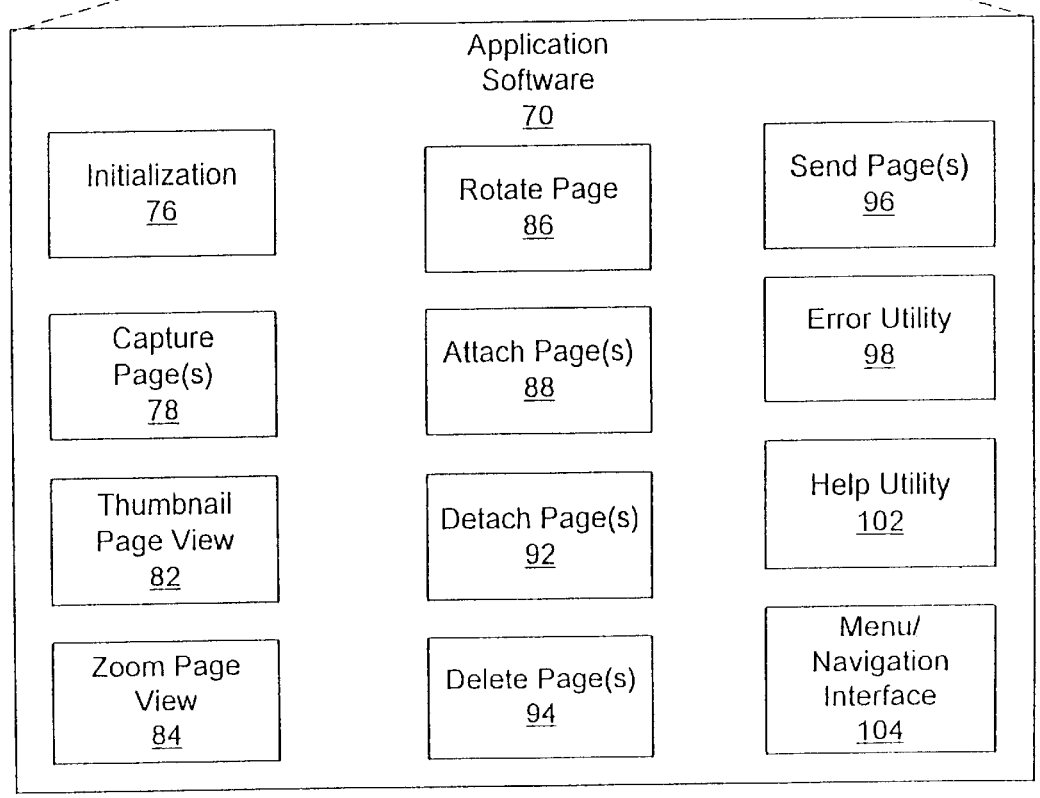

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each scan. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., Santa Clara, Calif., U.S.A., which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the JPEG standard; however, other public or proprietary standards can be used with equal success. In the preferred embodiment, CCITT-G4, which is designed for facsimile usage and black and white images, is used. Finally, application software 70 comprises the control programs that implement the various features of appliance 22. Application software 70 and device drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72 and assembly language for the most time critical sections.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. Note that an image captured in memory is interchangeably referred to herein as a "page" because the image is portrayed in appliance 22 as a physical page of text and/or imagery. A brief overview of each of the aforementioned modules follows hereafter.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. The thumbnail view presents an entire page on display 24. Zoom view module 84 allows the user to magnify a portion of a page. Page rotation module 86 allows the user to rotate a page either in thumbnail or zoom view in 900 increments. Attach page module 88 allows the user to logically join pages together to form a group of pages that can be deleted, sent or viewed as an individual unit, but not rotated or zoomed. Rotation and zoom always apply only to the current page. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. This software module shall be discussed in further detail hereinafter. Help utility module 102 provides the user, in real time, with general instructions and animations on operating appliance 22 and context sensitive instructions for performing a specific operation. Lastly, menu/navigation interface module 104 provides the user with graphical menus for performing various operations and processes the user's response thereto.

Figure 3:
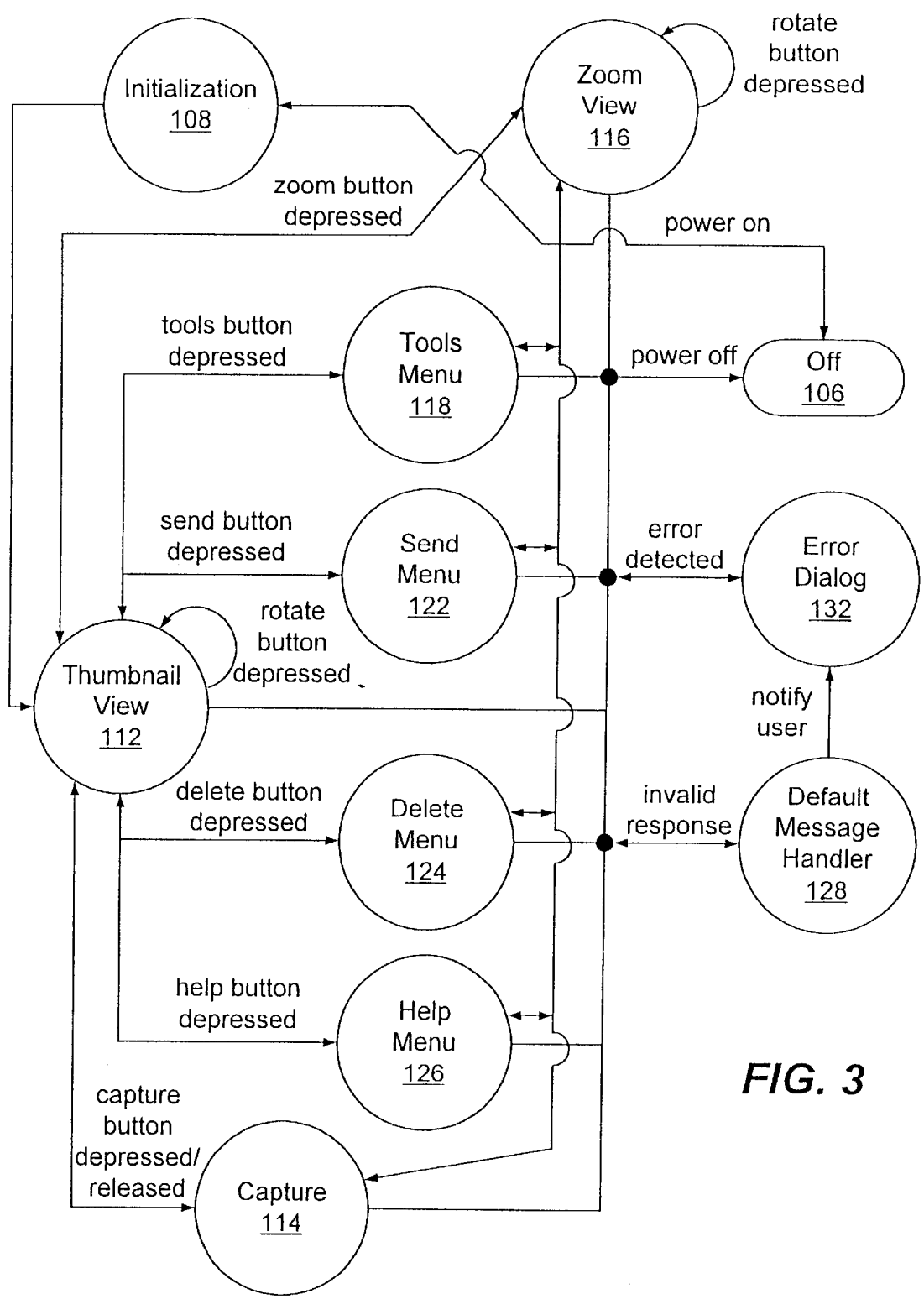
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. If the image capture is performed incorrectly, then the error dialog 132 which can be entered from any state, may be invoked. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28 or performing certain actions such as capture, send, delete, attach, detach, etc. Additionally, the thumbnail view state 112 includes functionality for the empty (no images) state and the image verification state. Navigation buttons 46 and 48 are used for panning when in zoom mode.

From thumbnail view state 1 12, one of four menu states can be entered depending on the choice made by the user. First, activation of tools button 38 will transition the system into tools menu state 118 where a menu of possible page operations and/or features is exhibited on display 24. Second, activation of send button 26 will transition the system into send menu state 122 where a menu of options for transferring a page or group of pages to another appliance, device or system is exhibited on display 24. Third, activation of delete button 34 will transition the system into delete menu state 124 where a menu of options for deleting a page or group of pages from memory 64 is exhibited on display 24. Lastly, activation of help button 36 will transition the system into help menu state 126 where a menu of help topics is exhibited on display 24. Once any of the aforementioned menu states is reached, the user can choose a desired menu option by using navigation buttons 42 and 44 and then validating the choice by pressing a confirmation button. Menu states may be exited or "canceled" by simply invoking a navigation button to transition to a previous state. In the preferred embodiment of the present invention, the left navigation button 46 has been designated as the cancel button in menu states.

From some states, an invalid response by the user (i.e., user presses an inactive button) will be ignored or will result in a transition to the default message handler state 128 where the user response is interpreted through the message that was generated internally and a transition is made to the error dialog state 132 to notify the user of their error via a message or graphic on display 24. Inactive buttons will occasionally also display a blinking icon to communicate to the user the selection of the inactive button and which buttons are active. Alternatively, error dialog state 132 can be entered directly if application software 70 detects an error in the execution of a valid operation. The most common example of this is when the user follows an improper capture path with appliance 22 during the image capture process. In the preferred embodiment, within error dialog boxes, the left navigation button 46 has been designated as the cancel button to provide user acknowledgment and remove the error dialog box from the display screen 24 as displayed in FIG. 4.

The features provided by the error utility software module 98 will be described hereafter with frequent reference to (a) the architecture and operation of the application software 70 of FIG. 2; (b) the flowchart of FIG. 8, and (c) the captured screen illustrations of FIG. 4A through FIG. 7B.

Operation of the Error Utility Interface and Method

Recall from the state diagram of FIG. 3 that when power is provided via switch 56 (FIG. 1C) application software 70 passes through a transient initialization state 108 to reach thumbnail view state 112, which is the default state for capturing images using capture button 54 and viewing images. Although the error dialog 132 state may be entered from any other state, error dialog is commonly entered when the user incorrectly attempts to capture an image. The error utility 98 may work in conjunction with the help utility 102 to assist the user in solving a user operational problem with the appliance. In addition to capturing errors, input/output errors may occur when the appliance is communicating with a serial device or infra-red device.

Figure 4A:
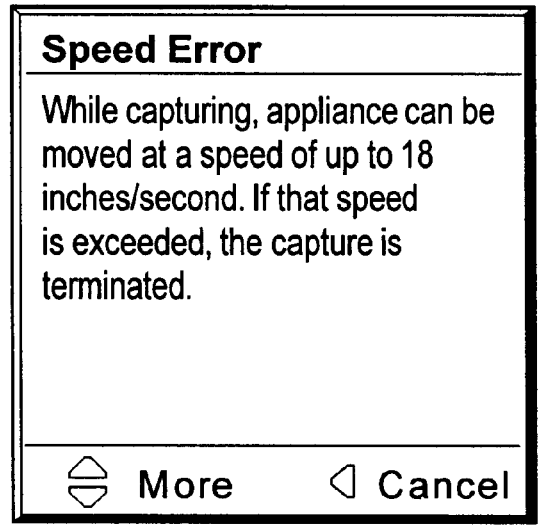
FIG. 4A illustrates the speed error text error message as displayed on the display screen of FIG. 1A.
Figure 4B:
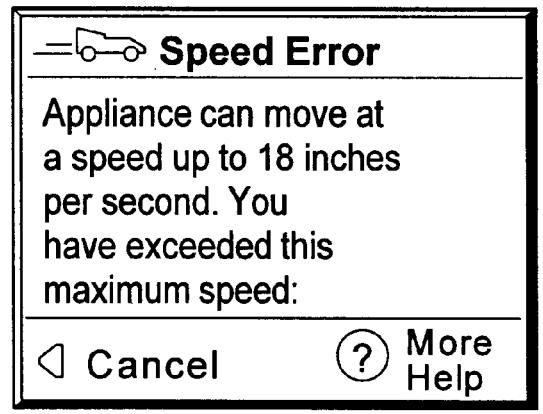
FIG. 4B illustrates an alternate embodiment of the speed error text error message displayed in FIG. 4A as displayed on the display screen of FIG. 1A.
Figure 5A:
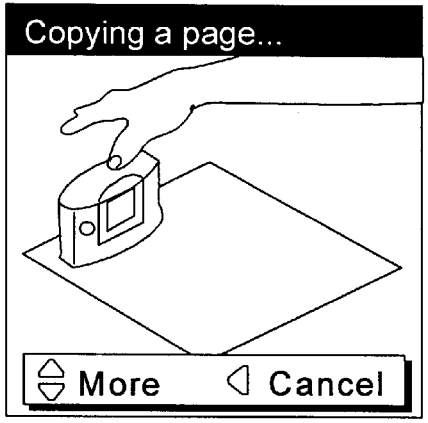
FIG. 5A illustrates a snapshot of the beginning of an animated sequence as displayed on the display screen of FIG. 1A, which communicates to the user how to correctly capture an image using the appliance of FIG. 1A through FIG. 1D.
Figure 5B:
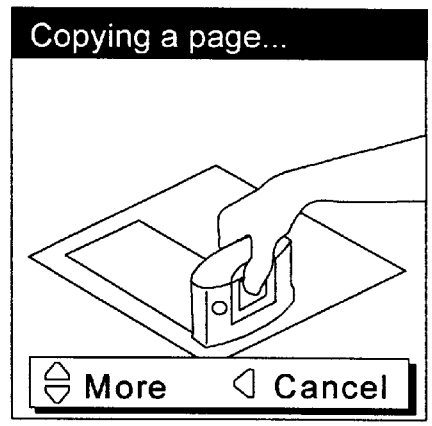
FIG. 5B illustrates a snapshot of the middle of an animated sequence as displayed on the display screen of FIG. 1A, which communicates to the user how to correctly capture an image using the appliance of FIG. 1A through FIG. 1D.
Figure 5C:
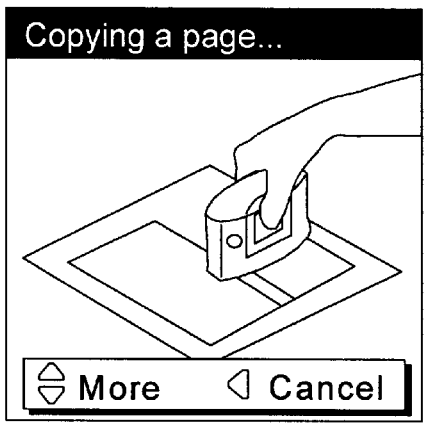
FIG. 5C illustrates a snapshot of the middle of an animated sequence as displayed on the display screen of FIG. 1A, which communicates to the user how to correctly capture an image using the appliance of FIG. 1A through FIG. 1D.
Figure 5D:
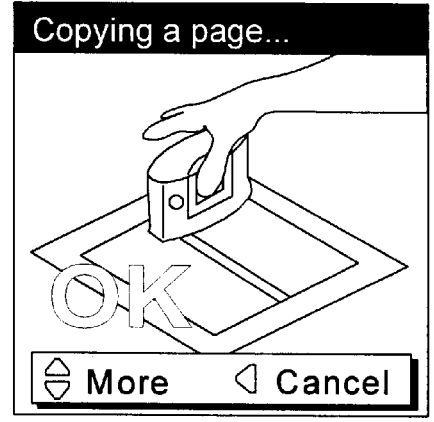
FIG. 5D illustrates a snapshot of the end of an animated sequence as displayed on the display screen of FIG. 1A, which communicates to the user how to correctly capture an image using the appliance of FIG. 1A through FIG. 1D.
Figure 6A:
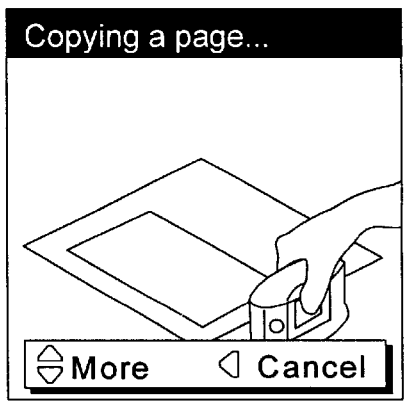
FIG. 6A illustrates a snapshot of the beginning of an animated sequence as displayed on the display screen of FIG. 1A, which communicates to the user how the appliance of FIGS. 1A through 1D was operated incorrectly by leaving the page during a capture.
Figure 6B:
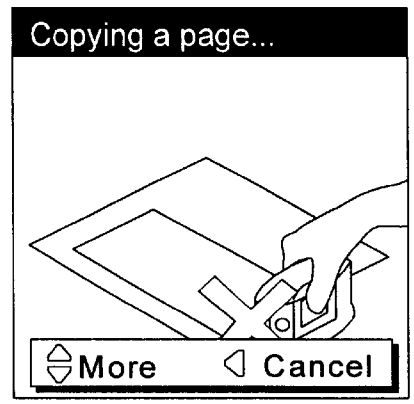
FIG. 6B illustrates a snapshot of the end of an animated sequence as displayed on the display screen of FIG. 1A, which communicates to the user how the appliance of FIGS. 1A through 1D was operated incorrectly by leaving the page during a capture.
Figure 7A:
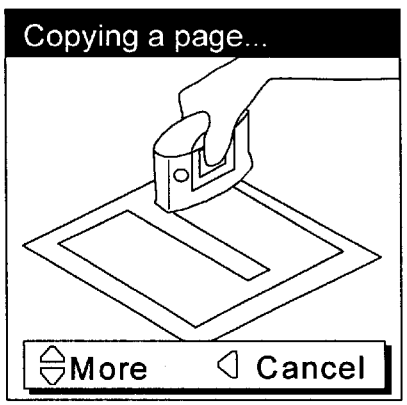
FIG. 7A illustrates a snapshot of the beginning of an animated sequence as displayed on the display screen of FIG. 1A, which communicates to the user how the appliance of FIGS. 1A through 1D was operated incorrectly by not allowing sufficient overlap of the capturing paths.
Figure 7B:
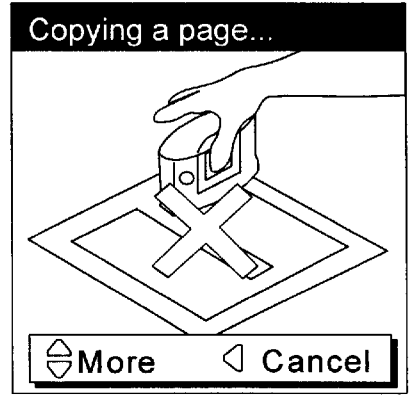
FIG. 7B illustrates a snapshot of the end of an animated sequence as displayed on the display screen of FIG. 1A, which communicates to the user how the appliance of FIGS. 1A through 1D was operated incorrectly by not allowing sufficient overlap of the capturing paths.
Figure 8:
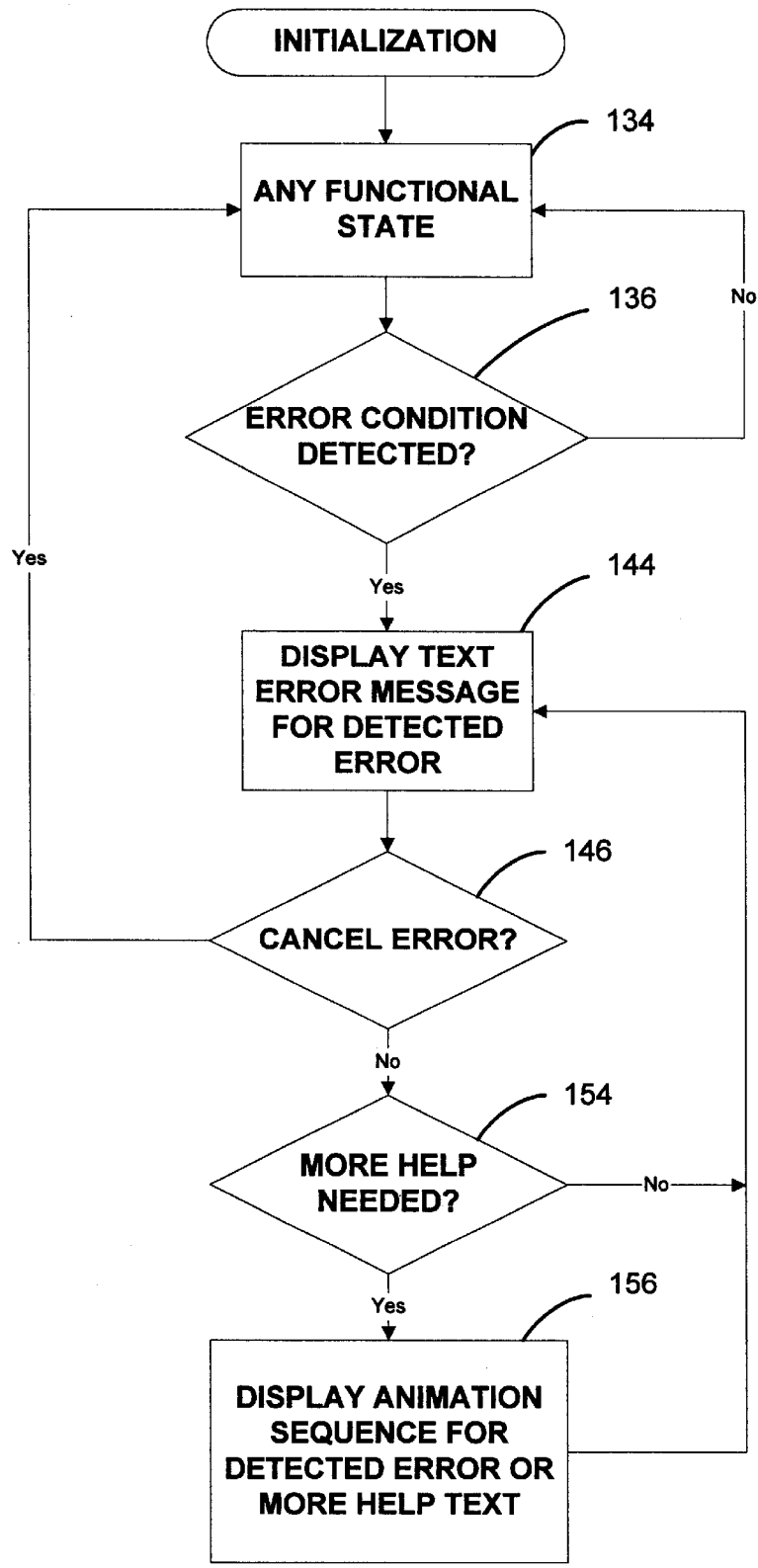
FIG. 8 is a functional flowchart which represents the operation of the appliance of FIG. 1A through FIG. 1D through the error dialog state.

FIG. 8 is a functional flowchart detailing the operation of the method of user communication within the error interface and method. After initialization of the appliance at power up, and while the appliance is operating in any functioning state 134, the error utility software module 98 determines whether an error condition occurs 136. Once an error has been detected, logic determines what error has occurred and displays the appropriate text error message in a dialog box 144 as illustrated in FIG. 4A and FIG. 4B. The left navigation button 46 is designated as the cancel button and serves as user acknowledgment that the user sees and understands his error in operating the appliance. If the user cancels the error dialog box 146, then the appliance is returned to the previous functional state 134. However, if the user does not cancel the error, the logic checks for the activation of a button communicating that more help is needed 154. The up and down navigation buttons 42, 44 are designated to scroll the error text up and down within the error dialog box and is designated by "More" within the dialog box as illustrated in FIG. 4A. However, at the end of the text, the down navigation button 44 may activate an animation sequence to further instruct the user 156 as illustrated in FIGS. 5A through 5D. Optionally, an additional confirmation button such as the help button 36 may be designated to start the animation sequence 156. If the appropriate button is depressed, the animation sequence starts 156. In the preferred embodiment, animation starts automatically when it is scrolled onto the screen. If any animations are included in error dialogs, they will be embedded in the text and will be accessible by using the up and down navigation buttons 42 and 44. The animation will start running as soon as it scrolls completely onto the screen. The error dialog is functionally identical to the help dialog, except that it includes a title bar at the top indicating the error. By way of example, FIGS. 5A through 5D are snapshots in time of an animated sequence showing the user how to correctly operate the appliance in capturing a page. The animation sequence in these figures are only examples and are not meant to exclude other animated sequences. FIG. 5D communicates to the user that the method displayed in the animated sequence is "OK" to use for the purposes of capturing an image. FIG. 6A and FIG. 6B are animated snapshots showing an erroneous operation of the appliance. In these figures the user has incorrectly guided the appliance off the page. In FIG. 6B the "M" communicates to the user that this is incorrect operation of the appliance. FIG. 7A and FIG. 7B are animated snapshots of yet another erroneous operation of the appliance. In FIG. 7A, it is visible that the guided path of the appliance does not overlap, hence the error of "Insufficient Overlap." In FIG. 7B, the "X" communicates to the user that the method displayed in the animation was an incorrect way to operate the appliance. Other animation sequences are contemplated for other possible errors in assisting the user in correctly operating the appliance.

The error utility program 98 of the present invention can be implemented in hardware, software, firmware, or a combination thereof. In the preferred embodiment(s), the error utility program 98 is implemented in software or firmware that is stored in a memory 64 and that is executed by a suitable instruction execution system.

The error utility program 98, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory 64.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A hand-held image capture and communication appliance, comprising:
   a photoelement array for acquiring image data;
   a memory for saving said image data;
   a processor in communication with said memory;
   a display in communication with said processor for exhibiting said image data; and
   program code stored in said memory and executed by said processor for manipulating said image data, said program code comprising an error utility software module for providing a user with information on incorrectly operating said hand-held image capture and communication appliance.

2. The appliance of claim 1, wherein said program code further comprises:
   an error utility software module for providing the user with information on correctly operating said appliance.

3. The appliance of claim 1, wherein said program code further comprises:
   a first code segment for displaying text on said display.

4. The appliance of claim 3, wherein said program code further comprises:
   a second code segment for displaying an animation on said display.

5. A hand-held image capture and communication appliance, comprising:
   capturing means for acquiring image data;
   storage means for saving said image data;
   processing means in communication with said storage means;
   display means in communication with said processing means for exhibiting said image data; and
   program means stored in said storage means and executed by said processing means for manipulating said image data, said program means comprising an error utility software module for providing a user with information on incorrectly and correctly operating said hand-held images capture and communication appliance.

6. The appliance of claim 5, wherein said program means further comprises:
   a dialog module for displaying information on a plurality of operational errors and correct method of operation on said display and processing any user selection for more information.

7. The appliance of claim 5, wherein said error utility module comprises:
   a first code segment for displaying text on said display.

8. The appliance of claim 5, wherein said error utility module comprises:
   a second code segment for displaying an animation on said display.

9. The appliance of claim 5, wherein said program means further comprises a dialog module for displaying information on a plurality of operational errors and correct method of operation on said display and said error utility software module comprises:
   a first code segment for displaying text correlated with at least one of said operational errors on said display;
   a second code segment for displaying an animation correlated with at least one of said operational errors on said display; and
   a third code segment for scrolling said display to communicate a plurality of screens of information to the user.

10. The appliance of claim 9, further comprising:

a fourth code segment for providing an icon representative of a user interface on said appliance for scrolling between screens of information on said display.

11. The appliance of claim 10, wherein said icon comprises:

a pair of opposing arrows with each arrow uniquely representing a logical scroll direction.

12. A method for providing error information to a user of a hand-held image capture and communication appliance having a built-in display, comprising the steps of:

processing a user execution of an erroneous operation performed by the user of the hand-held image capture and communication appliance; and displaying a textual dialog containing operational error information and method of correct operation information that is correlated with said erroneous operation executed by the user of the hand-held image capture and communication appliance.

13. The method of claim 12, further comprising the step of:

scrolling said display to communicate a plurality of screens of information in response to a logical scroll direction entered by the user.

14. The method of claim 13, further comprising the step of:

providing an icon representative of a user interface on said appliance for scrolling between screens of information on said display.

15. The method of claim 14, wherein said icon comprises a pair of opposing arrows with each arrow representing a unique said logical scroll direction and further comprising the step of:

emphasizing one of said arrows representing a correct logical scroll direction in response to an invalid scroll direction entered by the user.

16. The method of claim 15, wherein said arrow representing said correct logical scroll direction is emphasized through blinking.

17. A method for providing error information to a user of a hand-held image capture and communication appliance having a built-in display, comprising the steps of:

processing a user execution of an erroneous operation performed by the user of the hand-held image capture and communication appliance; and displaying an animated sequence conveying operational error information and method of correct operation information that is correlated with said erroneous operation executed by the user of the hand-held image capture and communication appliance.

18. The method of claim 17, wherein said animation plays when scrolled onto said display.

19. The method of claim 18, wherein said animation replays after completion when scrolled off said display and onto said display again.

20. A computer readable medium having a program for manipulating image data acquired by a hand-held image capture and communication appliance, said program code comprising:

logic configured to recognize erroneous operation of said hand-held image capture and communication appliance; and logic configured for displaying a textual dialog containing operational error information and method of correct operation information that is correlated with said erroneous operation executed by the user of the hand-held image capture and communication appliance.

21. The computer readable medium of claim 20, further comprising:

logic configured for scrolling said display to communicate a plurality of screens of information in response to a logical scroll direction entered by the user.

22. The computer readable medium of claim 21, further comprising:

logic configured for providing an icon representative of a user interface on said appliance for scrolling between screens of information on said display.

23. A computer readable medium having a program for manipulating image data acquired by a hand-held image capture and communication appliance, said program code comprising:

logic configured to recognize erroneous operation of said hand-held image capture and communication appliance; and logic configured for displaying an animated sequence containing operational error information and method of correct operation information that is correlated with said erroneous operation executed by the user of the hand-held image capture and communication appliance.

24. A hand-held image capture and communication appliance, comprising:

processing means for processing a user execution of an erroneous operation of the hand-held image capture and communication appliance; and display means for displaying a textual dialog containing operational error information and method of correct operation information that is correlated with an erroneous operation executed by a user of the hand-held image capture and communication appliance.

* * * * *